Patented Aug. 6, 1940

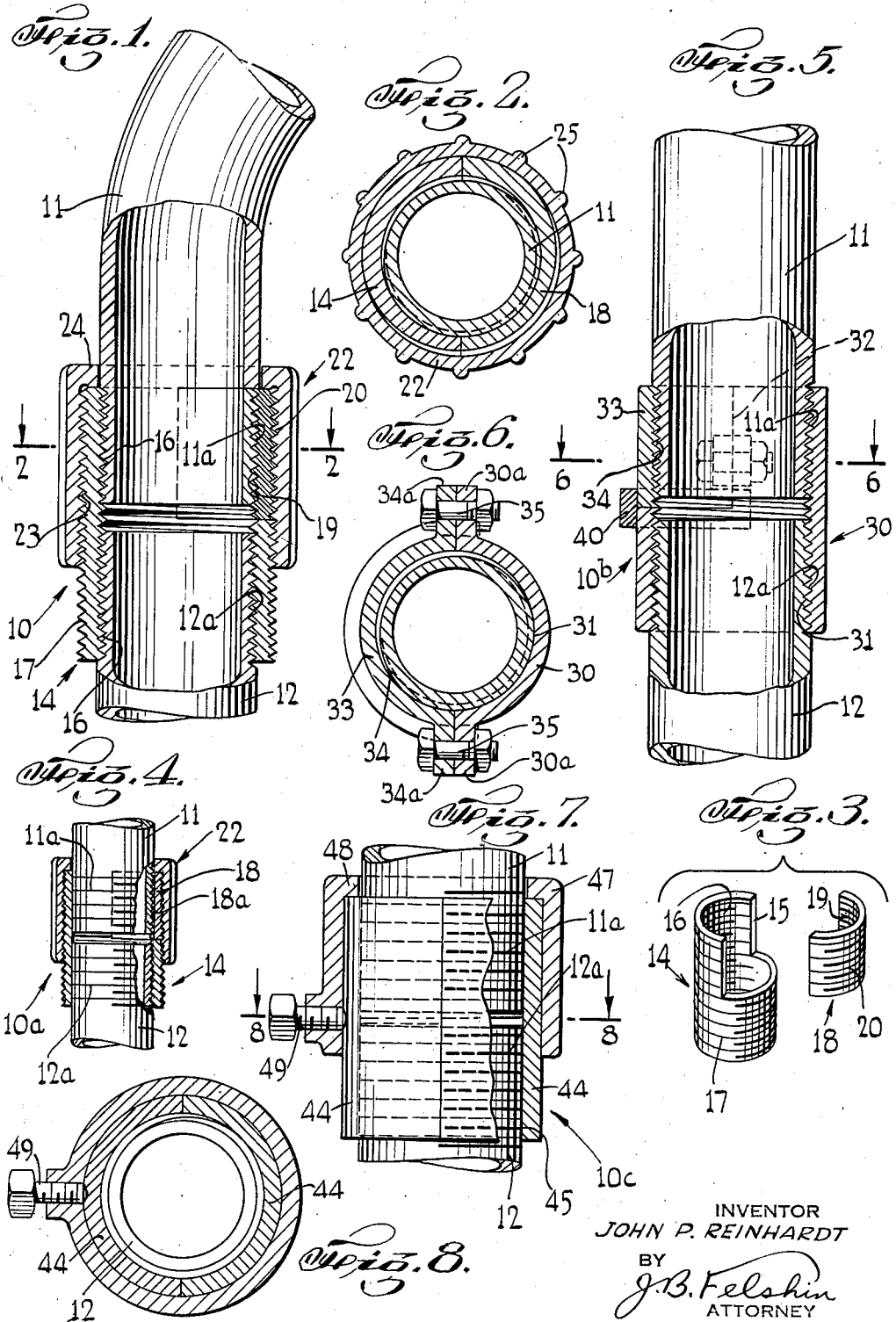

2,210,340

UNITED STATES PATENT OFFICE 2,210,340

COUPLING

John P. Reinhardt, Brooklyn, N. Y.

Application May 16, 1939, Serial No. 273,877

4 Claims. (Cl. 285—128)

This invention relates to couplings. It is particularly directed to a coupling for securing together the meeting ends of pipes, the coupling being so constructed that the pipes may be coupled thereby without necessity for rotating or turning the pipes.

A further object of this invention is to provide a coupling of the character described, comprising a two part threaded sleeve receiving the screw threaded meeting ends of the pipes to be coupled, and an outer sleeve to unite the two parts of the first sleeve, and to cover the split between said parts to prevent passage of any substance through the split, as for example, when the coupling is embedded in concrete.

A still further object of this invention is to provide a strong, rugged and durable coupling of the character described, which shall be relatively inexpensive to manufacture, easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a longitudinal, cross-sectional view of a coupling embodying the invention, attaching together the screw threaded meeting ends of a pair of pipes;

Fig. 2 is a cross-sectional view taken on line 2—2 of Fig. 1;

Fig. 3 is a perspective view of the two parts of the inner sleeve of the coupling, separated from one another;

Fig. 4 is a view similar to Fig. 1, but illustrating a modified construction;

Fig. 5 is a view similar to Fig. 1, but illustrating a still further modified construction;

Fig. 6 is a cross-sectional view taken on line 6—6 of Fig. 5;

Fig. 7 is a view similar to Fig. 1, and illustrating a modified form of the invention; and Fig. 8 is a cross-sectional view taken on line 8—8 of Fig. 7.

Referring now in detail to the drawing, 10 designates a coupling embodying the invention, to couple together or attach together the screw threaded meeting ends of a pair of pipes 11 and 12. The pipes 11 and 12 are of similar outer diameter and said pipes have external screw threads adjacent ends 11a and 12a, respectively.

The coupling 10 comprises a two part inner tubular sleeve comprising one part 14 having a semi-cylindrical portion thereof, cut-away at one end thereof, as at 15. The sleeve part 14 has internal screw threads 16 and external screw threads 17.

Fitted within the cut-away portion 15, of sleeve part 14, is a semi-cylindrical member or part 18 of the same thickness as the part 14 and having internal screw threads 19 complementary to the threads 16, and external screw threads 20 complementary to the screw threads 17. The length of cut-out 15, and hence member 18, is preferably about somewhat less than half of the length of the sleeve part 14.

The sleeve part 14 may be screwed half way onto the screw threaded portion 12a of the pipe 12. The pipe 12 should preferably not project beyond the cylindrical portion of the sleeve part 14. The screw threaded portion 11a of the pipe 11 may then be fitted into the upper portion of the sleeve part 14 to engage the threads thereof. Member or part 18 may then be fitted into the cut-away portion 15 of the sleeve part 14, so that the screw threads 19 thereof will engage the screw threads 11a of the pipe 11.

Screwed onto the upper end of the fitted together sleeve parts 14 and 18 is an outer sleeve 22 having internal screw threads 23 adapted to be screwed to the outer screw threads 17, 20 of said parts. The sleeve 22 is of such length as to cover part 18 entirely, and to extend therebeyond, thus covering the entire split or the meeting surfaces between the parts 14 and 18. The sleeve 22 at its upper end has an inwardly extending, annular flange 24 adapted to contact the upper edges of sleeve parts 14 and 18 serving as a stop to limit movement of the outer sleeve relative to the inner sleeve. At the outer surface thereof, the sleeve 22 may be formed with longitudinal ribs 25, serving as grips for a wrench.

The sleeve 22 is first passed onto the pipe 11 before the member 14 is screwed to the pipe 12, so that it will be in position for screwing onto the sleeve parts 14 and 18.

It will be noted that the sleeve 22 covers the split between the parts 14 and 18 so as to exclude passage of any substance through the split between said parts, as for example, when the coupling is embedded in concrete.

The coupling 10a shown in Fig. 4 is similar to the coupling 10 of Fig. 1, with the exception that the inner surface of part 18a of the inner sleeve of the former is smooth, the screw threads 19 being eliminated.

In Figs. 5 and 6 there is shown a coupling 10b illustrating a modified construction. The coupling 10b comprises a sleeve part 30 having internal screw threads 31. The sleeve part 30 has a semi-cylindrical cut-away portion 32 at one end thereof, to receive a semi-cylindrical sleeve part 33 having internal screw threads 34 complementary to the screw threads 31.

Sleeve parts 30 and 33 are formed with contacting diametrically disposed, apertured ears 30a and 34a receiving bolts 35 for fixing said parts together. Sleeve part 30 is screwed half way onto the screw threaded portion 12a of pipe 12. The lower end 11a of pipe 11 fits into the upper portion of the sleeve part 30. Sleeve part 33 is then fitted within the cut-away portion 32 and is attached to the part 30. Thereafter, a split spring ring 40 of somewhat greater than semi-circular extent may be snapped onto the sleeve part 30 to cover the lower edge of part 33 for preventing any material from passing into the coupling.

In Figs. 7 and 8 there is shown a coupling 10c comprising a pair of complementary semi-cylindrical sleeve parts 44 having complementary internal screw threads 45 to receive the screw threaded end portions 11a and 12a of the pipes 11 and 12. The semi-cylindrical parts 44 together form a cylindrical sleeve.

Slidably mounted on said sleeve is an outer sleeve 47, having a smooth inner surface and formed at one end with an annular flange 48 contacting one end of the split sleeve. On sleeve 47 is a set screw 49 adapted to be screwed against the sleeve 44 to retain the outer sleeve 47 against movement.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A coupling comprising a cylindrical sleeve formed at one end with a semi-cylindrical cut-out extending substantially half the length of said sleeve, said sleeve having external and internal screw threads, a semi-cylindrical member fitting into said cut-out and having internal and external screw threads complementary to the internal and external screw threads of the sleeve, and an outer sleeve screwed onto said end of said first sleeve and onto said semi-cylindrical member, said outer sleeve having an inwardly extending annular flange at one end, and being of greater length than said semi-cylindrical member.

2. A coupling comprising a cylindrical sleeve formed at one end with a semi-cylindrical cut-out extending substantially half the length of said sleeve, said sleeve having external and internal screw threads, a semi-cylindrical member fitting into said cut-out and having internal and external screw threads complementary to the internal and external screw threads of the sleeve, and an outer sleeve screwed onto said end of said first sleeve and onto said semi-cylindrical member, said outer sleeve having an inwardly extending annular flange at one end, and being of greater length than said semi-cylindrical member, said outer sleeve having longitudinal ribs on the outer surface thereof.

3. A coupling comprising a sleeve having a cylindrical portion and a semi-cylindrical cut-away portion, a semi-cylindrical member fitting into said cut away portion, said sleeve being formed with internal and external threads, said semi-cylindrical member having external screw threads complementary to the external screw threads of the sleeve, and means for attaching said sleeve to said member.

4. A coupling comprising a sleeve having a semi-cylindrical cut-away portion at one end and being formed with internal threads, a semi-cylindrical member fitted within said cut-away portion, and an outer sleeve on said end of said first sleeve and member, and having an inwardly extending portion at one end adapted to contact said end of said first sleeve and entirely covering the semi-cylindrical member.

JOHN P. REINHARDT.